United States Patent
Bunsmann et al.

(10) Patent No.: US 7,712,825 B2
(45) Date of Patent: May 11, 2010

(54) FOLDING TOP FOR A MOTOR VEHICLE

(75) Inventors: Winfried Bunsmann, Bissendorf (DE); Juergen Theuerkauf, Bramsche (DE)

(73) Assignee: Wilhelm Karmann GmbH, Osnabrueck (DE)

(*) Notice: Subject to any disclaimer, the term of this patent is extended or adjusted under 35 U.S.C. 154(b) by 522 days.

(21) Appl. No.: 10/559,413

(22) PCT Filed: May 26, 2004

(86) PCT No.: PCT/DE2004/001091

§ 371 (c)(1),
(2), (4) Date: Mar. 3, 2008

(87) PCT Pub. No.: WO2004/108456

PCT Pub. Date: Dec. 16, 2004

(65) Prior Publication Data

US 2008/0203769 A1   Aug. 28, 2008

(30) Foreign Application Priority Data

Jun. 3, 2003   (DE) ................................ 103 24 920

(51) Int. Cl.
*B60J 7/04*   (2006.01)
*B60J 7/06*   (2006.01)

(52) U.S. Cl. ............................. 296/216.04; 296/216.06; 296/219

(58) Field of Classification Search ................. 296/218, 296/219, 216.04, 216.06
See application file for complete search history.

(56) References Cited

U.S. PATENT DOCUMENTS

| 3,348,877 | A |   | 10/1967 | Caramanna |
| 3,476,437 | A | * | 11/1969 | Schroeder et al. ............ 296/218 |
| 4,290,640 | A | * | 9/1981 | Dalton ....................... 296/95.1 |
| 4,475,764 | A | * | 10/1984 | Hutchinson et al. ..... 296/136.11 |
| 4,552,401 | A | * | 11/1985 | Trenkler ...................... 296/219 |
| 4,626,026 | A | * | 12/1986 | Hasegawa ................... 296/218 |
| 4,729,596 | A | * | 3/1988 | Fujihara et al. .............. 296/218 |
| 5,080,428 | A | * | 1/1992 | Rouland ..................... 296/218 |
| 5,299,791 | A | * | 4/1994 | Schlapp ...................... 296/219 |

FOREIGN PATENT DOCUMENTS

| DE | 28 48 094 A1 | 5/1980 |
| DE | 100 42 491 A1 | 3/2002 |
| JP | 60064027 A | 4/1985 |
| JP | 07246839 A | 9/1995 |

* cited by examiner

*Primary Examiner*—Dennis H Pedder
(74) *Attorney, Agent, or Firm*—Rothwell, Figg, Ernst & Manbeck, P.C.

(57) ABSTRACT

The invention relates to a folding top for a motor vehicle, comprising at least one first and at least one second structural element (6, 7), which are covered by a flexible roof panel (8). Said structural elements (6, 7) are designed to be mounted and detached transversally to the direction of the vehicle by means of a roof opening (2) and once attached, are fixed at the front to the windscreen frame (3) and at the rear to a bow (4) that spans the width of the vehicle. The flat structural elements (6, 7) are interconnected by means of guide devices (14, 15) and can be displaced in relation to one another transversally to the direction of the vehicle by means of said devices (14, 15).

17 Claims, 6 Drawing Sheets

FOLDING TOP FOR A MOTOR VEHICLE

The invention relates to a folding top for a motor vehicle, comprising at least one first and one second structural element, which are covered by a flexible roof panel. Said structural elements are designed to be mounted and detached transversally to the direction of the vehicle by means of a roof opening and once attached, are fixed at the front to the windshield frame and at the rear to a bow that spans the width of the vehicle.

Soft tops for motor vehicles comprising a roof opening between the windshield frame and a rear bow designed as a rollover bow, which are also called "Targa" vehicles, are known as foldable roofs with a bow construction or as rigid, flat roof covers.

When using bows, which are often covered by a flexible roof panel, it is frequently necessary to first span transversal- or longitudinal bows over the roof opening for spanning the folding top before the flexible roof panel can be pulled over said bows and fastened at lateral vehicle elements. However, mounting and detaching a folding top in this way requires many steps and because of the many parts involved also bears the risk that a roof element is inadvertently left out or lost over the course of time.

DE 1 580 535 B describes a folding top that essentially forms a unit and is detachably fastened to a windshield frame and a rollover bow spanning the passenger space of the motor vehicle, with the mounting at the windshield frame being rigid and the mounting at the rollover bow being elastic. This folding top is formed by lateral rails and reinforcements connecting the rails, which span over the passenger space transversally to the direction of the vehicle once mounted, as well as by a flexible roof panel spanned over the same.

With this solution, it is disadvantageous that the unfolding of the top in longitudinal direction of the vehicle over the roof opening and the connection of the folding top and the windshield frame and/or the rollover bow, where the folding top is fixed with one each front transversal reinforcement and/or a rear transversal reinforcement with plug- and joggle joints once mounted, requires a very high effort.

Furthermore, this known folding top has the disadvantage that although it can be partially folded in a z-like fashion in its longitudinal direction when detached, its foldability is limited and even when it is folded said top requires a relatively large storage space.

U.S. Pat. No. 3,348,877 describes a removable soft top having a flexible roof panel, with the roof panel running up to the breastwork of the vehicle and thus simultaneously forming side windows. In an area in the center of the vehicle, elastic, bow-like elements are arranged in receptacles at a windshield frame and a rear Targa bow, and when spanned, the flexible roof material runs over and is centered by said elements. To take down the roof, the folding top is folded in a z-like fashion from each side of the vehicle toward the center and then removed as a unit.

However, this type of folding top has the disadvantage of not being very stable and a so-called balloon-effect can be expected in particular toward the sides of the vehicle. Furthermore, with this known solution, the kinematics for mounting or detaching at the roof opening proves difficult to handle.

The slabs spanning the roof opening often create problems because of their size and generally form awkward units that are difficult to handle in particular for people of slight stature and furthermore require a large storage space.

U.S. Pat. No. 5,080,428 discloses a folding top for a Targa motor vehicle having two foldable slab elements which are tilted relative to one another by 180 degrees around a hinge to put the folding top down and therefore form a unit that is easier to store. However, this known solution has the disadvantage that it can be applied only with roofs that are only slightly convex, with the storage height being high even for roof elements of relatively low convexity because the roof elements are stored on top of one another with opposing convexity.

The present invention was therefore based on the problem of creating a folding top for a motor vehicle which forms a unit that is as easy to handle as possible, leaves a lot of creative freedom in the design of the roof opening, and requires little storage space when the top is down.

In accordance with the invention, the object of the invention is attained with a folding top for a motor vehicle which has at least one first and at least one second flat structural element that is covered by a flexible roof panel. Said structural elements are designed to be mounted and detached transversally to the direction of the vehicle over a roof opening and once attached are fixed at the front to the windshield frame and at the rear to a bow that spans the width of the vehicle, with the flat structural elements being interconnected by means of guide means and displaceable in relation to one another transversally to the direction of the vehicle by means of said guide means.

In the present case, the term "windshield frame" shall be interpreted in the widest sense because, for example, the flat structural elements can also be fixed to a roof element that borders a part of the frame enclosing the windshield.

A folding top designed in accordance with the invention, which can be operated manually and has flat structural elements that can be displaced relative to one another, is advantageous because it is a unit comprised of only a few individual parts, with the slab-like structural elements ensuring a high stability of the soft top.

The folding top in accordance with the invention furthermore has the advantage that regardless of the convexity of the flat structural elements, the folding top can be slid transversally to the direction of the vehicle into a compact unit in a telescope-like fashion and requires only a small storage space.

In accordance with a first advantageous embodiment, the flat structural elements can be slid into one another or in accordance with another advantageous embodiment they can be designed to be slid into a stack. In any case, the flat structural elements and the flexible roof panel form a unit that can be mounted and detached easily in no time.

A simple mechanism for sliding the flat structural elements into one another can be realized in that the first flat structural element is developed with at least one recess that runs transversally to the direction of the vehicle. A complementary shaped fin of a second flat structural element that is connected to the first flat structural element, can be inserted into said recess, with the flexible roof panel connected to the flat structural elements being folded once the flat structural elements have been slid into one another, and spanning at least one recess at the first flat structural element when said roof panel is mounted on the roof opening.

This type of development is not only characterized by the fact that very little storage space is required, but also by a low weight because the flat structural elements, which engage in a comb-like fashion, have a much lower weight than comparable rigid cover slabs.

A simple solution for developing the flat structural elements to be slid into a stack is to develop the guide means with two guide rails, which are developed like slots at the first structural element, and to provide rolling members or sliding members that reach through the slotted guide rails and are connected to a second flat structural element that can be slid over or under the first flat structural element.

In accordance with a preferred embodiment of the folding top in accordance with the invention, said folding top has two flat structural elements, but other embodiments may provide a plurality of flat structural elements that are interconnected by guide means and can be displaced relative to one another transversally to the direction of the vehicle.

Other advantages and advantageous embodiments of a folding top in accordance with the invention can be found in the description, the illustrations and the patent claims.

Three examples of embodiments of a folding top in accordance with the invention are shown in the illustration in a schematically simplified manner and explained in greater detail in the following description:

Shown are:

Ill. 1 a sectional three-dimensional view of a motor vehicle having a roof opening in Targa construction form and a first embodiment of a folding top in accordance with the invention;

Ill. 2 the roof opening according to Ill. 1 with a second embodiment of a folding top in accordance with the invention with flat structural elements that are slid into one another;

Ill. 3 the folding top according to Ill. 2 in a second state of mounting pulled farther over the roof opening;

Ill. 4 the folding top according to Ill. 2 and Ill. 3 in a state of mounting when it nearly completely covers the roof opening;

Ill. 5 a simplified cross-section through the folding top according to Ill. 2 along the line V-V in Ill. 3;

Ill. 6 a detailed representation of the folding top according to Ill. 2 to Ill. 4 along the line VI-VI in Ill. 4; and Ill. 7 a third embodiment of a soft top designed in accordance with the invention in a state where it partially covers the roof opening.

The Ill. 1 to 4 and Ill. 7 each show a section of a motor vehicle 1 from a lateral perspective, which is constructed as a Targa vehicle comprising a roof opening 2 between a windshield frame 3 and a bow 4, which here serves as a rollover bow in the rear and spans a passenger cell over the width of the vehicle.

For covering the roof opening 2, a respective folding top 5, 5', 5" is provided to be installed between the windshield frame 3 and the rollover bow 4, which represents a respective pre-mounted unit comprised of a first flat structural element 6, a second flat structural element 7 connected therewith and a flexible roof panel 8, which spans said structural elements once mounted on the roof opening 2.

The two respective flat structural elements 6, 7 that delimit the folding top 5, 5', 5" transversally to the direction of the vehicle once placed on the roof opening 2 each have a lateral rail 9 and/or 10 that connects the flat structural elements 6 and/or 7 to the lateral vehicle elements. In the present case, the first flat structural element 6 is developed to connect to lateral vehicle elements at the passenger side of the motor vehicle 1 and the second flat structural element 7 is designed to connect to lateral vehicle elements at the driver side of the vehicle 1.

A structurally simple catch-slot connection provides the interconnection to the lateral vehicle elements on the passenger side, which in the present case are usefully represented at the front side by the windshield frame 3 in the area of a passenger-side A-column 11 and at the rear by a lateral leg 4A of the rollover bow 4. A catch can be provided at the face areas of the lateral rail 9 assigned to the first structural element 6, and a curved slot can be provided at the A-column 11 and the corresponding leg 4A of the rollover bow 4, where the respectively introduced catch engages when the folding top 5, 5', 5" is spanned transversally to the direction of the vehicle.

Figure 5:
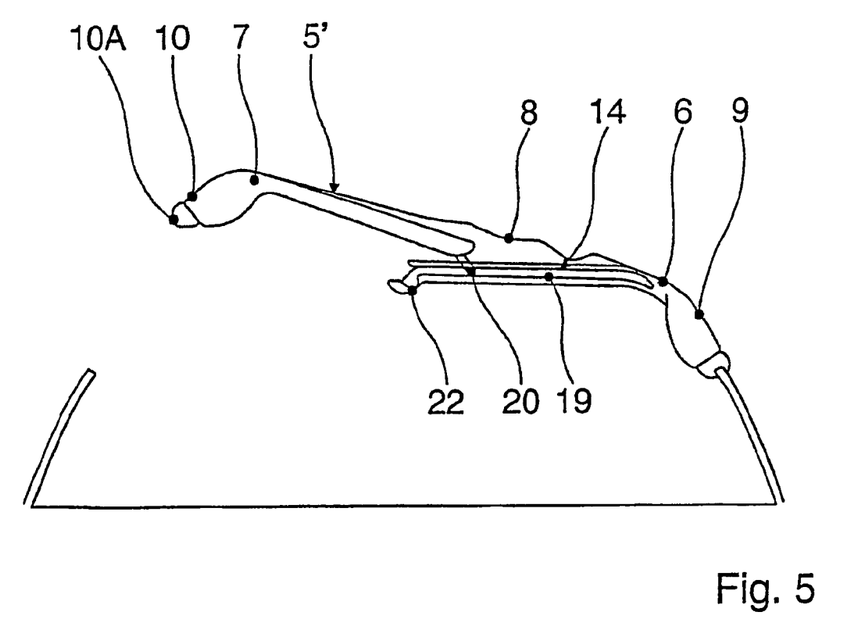
Figure 6:
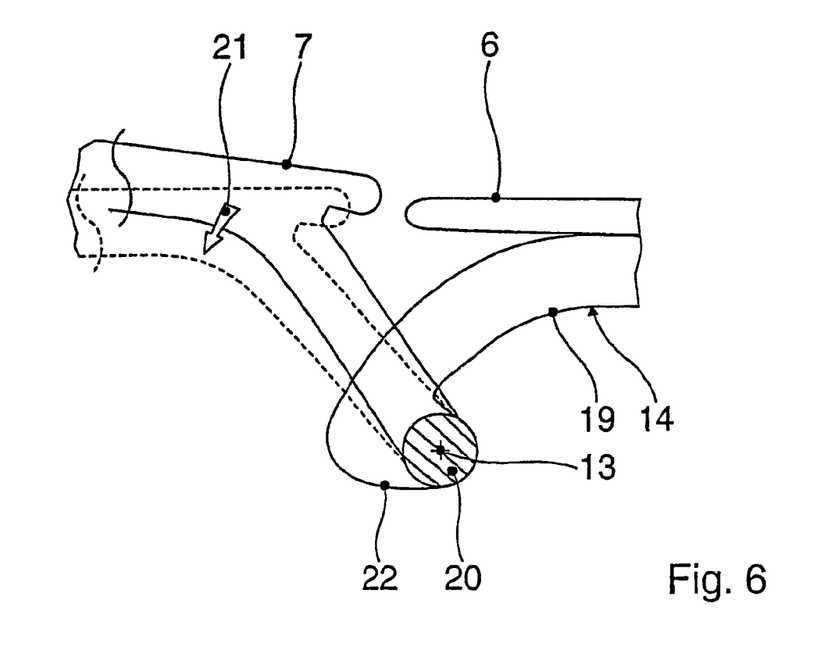

The second lateral rail 10 at the second flat structural element 7 on the driver side is rotatably mounted around a pivot axis 13 at the place of interconnection with the assigned driver side lateral vehicle elements, which in the present case represent a driver-side A-column 12 and a driver-side leg 4B of the rollover bow as shown, for example, in Ill. 5 and Ill. 6. When the pre-mounted unit of the folding top 5, 5', 5' is spread over the roof opening 2 after the first flat structural element 6 has been fixed by means of the lateral rail 9 at the passenger side, the second flat structural element 7 and its second rail 10 is swiveled manually downward around the pivot axis after installation so that the driver-side lateral rail 10 and its assigned lateral vehicle elements form a snap connection in a simple manner, for example by means of a spring-loaded pin and a corresponding recess.

Each of the flat structural elements 6, 7 designed to be mounted and detached over the roof opening 2 transversally to the direction of the vehicle are interconnected through guide means 14 and/or 15 and can be displaced toward one another by means of said guide means transversally to the direction of the vehicle.

In the embodiment according to Ill. 1 to Ill. 6, each of the flat structural elements 6, 7 can be displaced into one another, with the displacement into one-another of the flat structural elements 6, 7 being realized in that the first flat structural element 6 on the passenger side is developed with recesses 16 that run transversally to the direction of the vehicle, and complementary shaped fins 17 of the second flat structural element 7 which is connected to the first flat structural element 6 can engage in said recesses.

Figure 1:
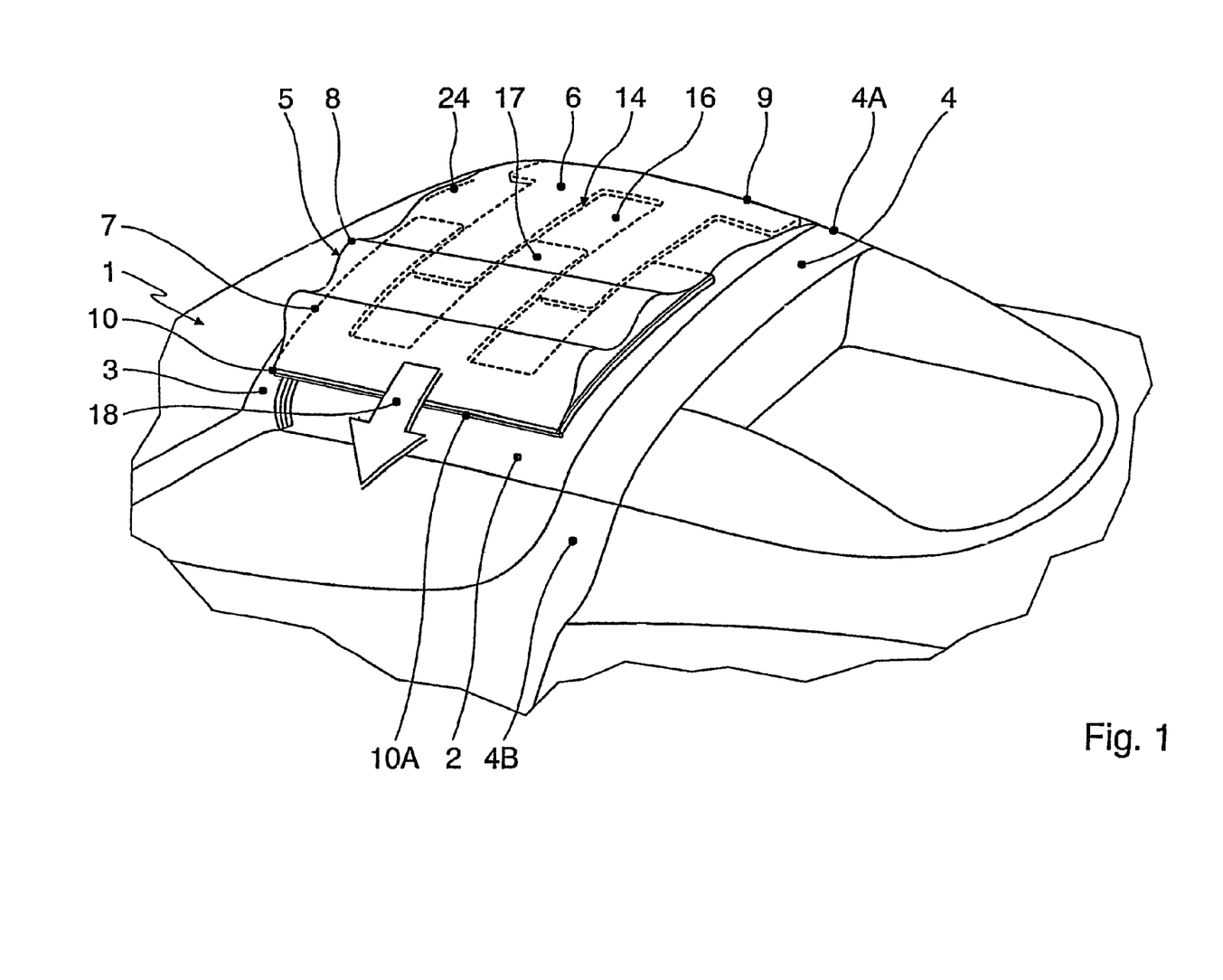
Figure 2:
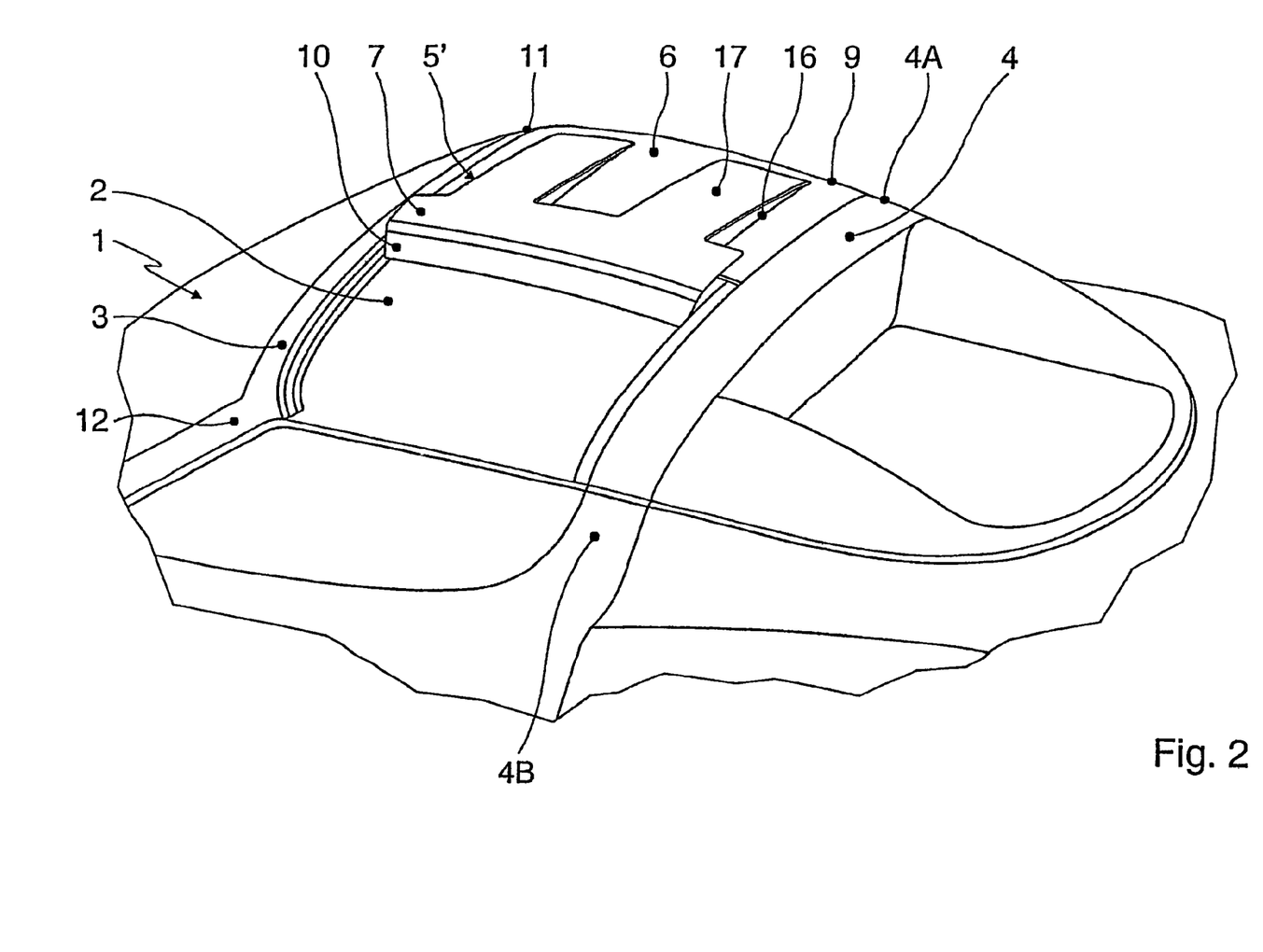
Figure 3:
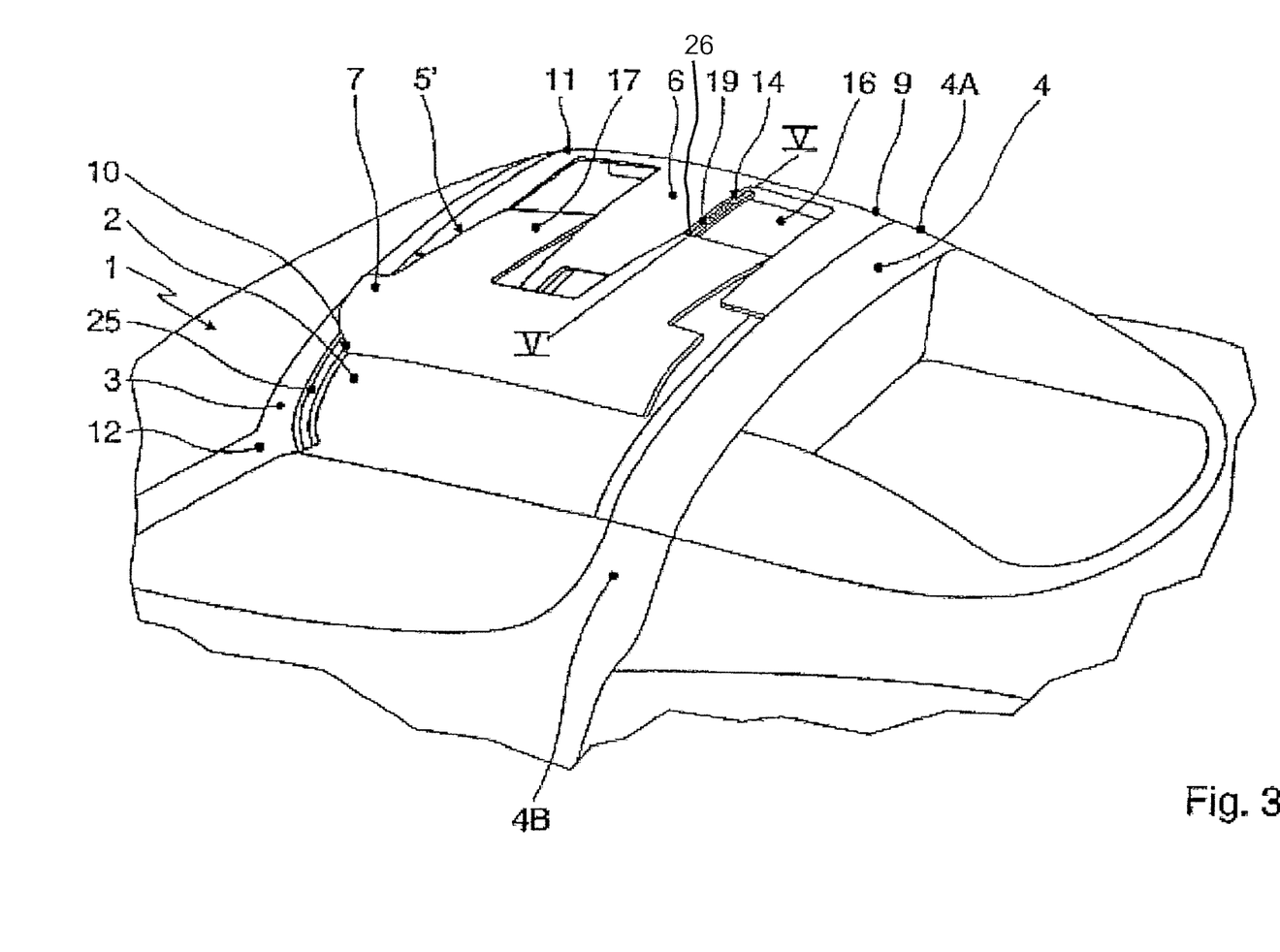
Figure 4:
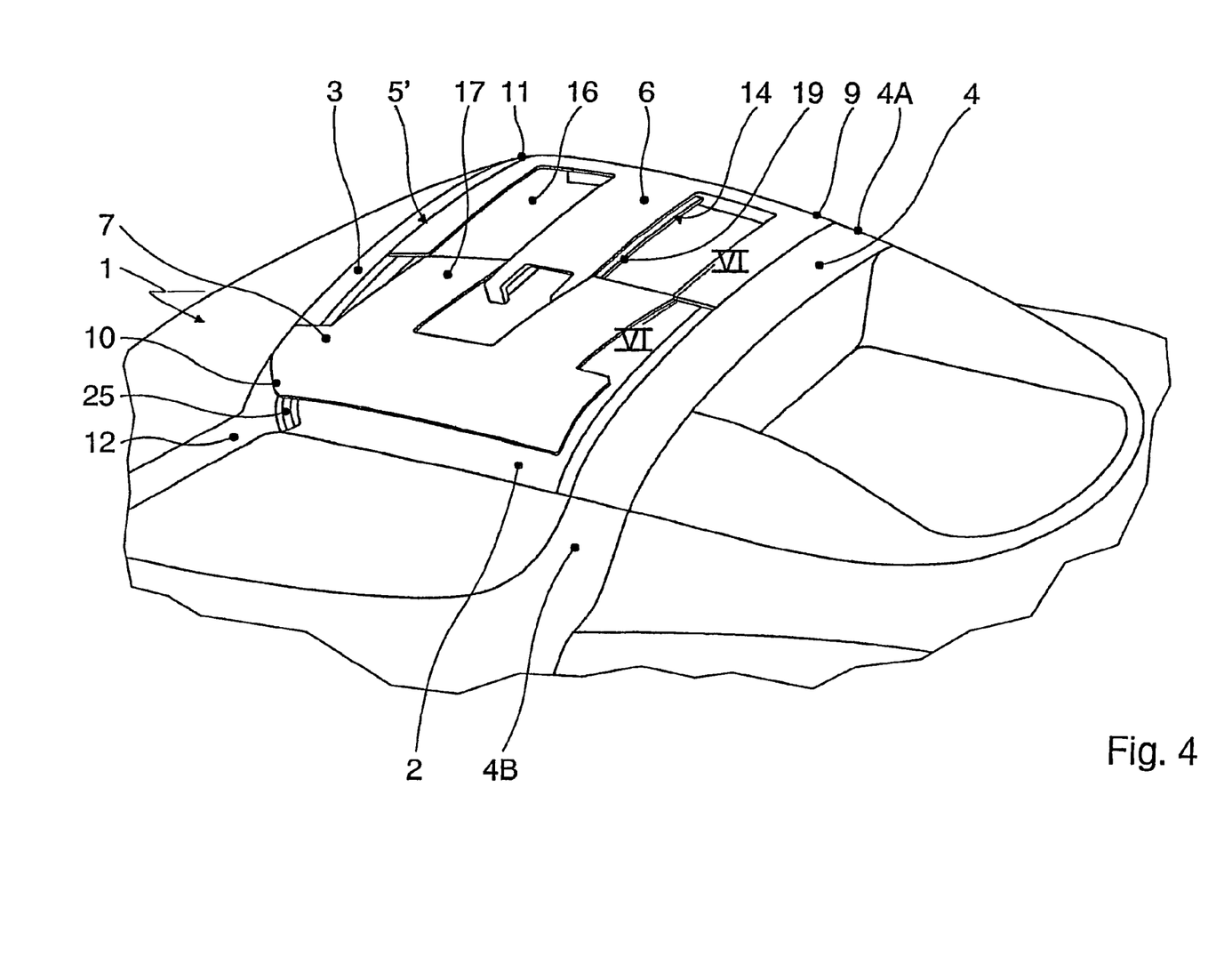

In the embodiment in accordance with Ill. 1 three respective fins 17 are provided at the second flat structural element 7, and said fins can be inserted in a comb-like fashion into three recesses 16 of the first flat structural element 6, of which one center recess is U-shaped and two lateral recesses are L-shaped.

In the embodiment according to Ill. 2 to Ill. 6, the first flat structural element 6 is developed with two recesses 16 and the second flat structural element 7 is developed with two fins 17, with the recesses 16 and the fins 17 again engaging in a comb-like fashion. Because of the comb-like development of the flat structural elements 6, 7, said structural elements can be slid into one another far enough when detaching the soft top from the roof opening 2 to form a compact unit that will require little storage space once the top has been removed.

The flexible roof panel 8, which is shown only occasionally for the sake of clarity in the Ill. 1 to Ill. 7, is fixed respectively at an area of the first and second structural element 6 and/or 7 which borders at the lateral side elements of the vehicle once fixed, with the fastening of the roof panel 8 being provided in the shown embodiments respectively through conventional closing means at the lateral rails 9 and 10. When the folding top 5 and/or 5' is spread over the roof opening 2 transversally to the direction of the vehicle indicated with an arrow 18 in Ill. 1, the flexible roof panel 8 covers the free spaces created between the recesses 16 and fins 17 and is not spanned.

The guide means 14, which in the embodiments according to Ill. 1 to Ill. 6 interconnect the flat structural elements 6 and 7 and enable their displacement toward one another, are presently formed by guide rails 19 and sliding members and/or sliding blocks movable therein transversally to the direction of the vehicle, with a guide rail 19 and a sliding block 20 guided therein being arranged at each lateral edge of the recesses 16 and fins 17 running transversally to the direction of the vehicle. As shown, the guide rails 19 may be affixed at a first flat structural element 6 on the passenger side and the sliding blocks 20 can be affixed at the second flat structural element 7, but it goes without saying that it is also possible to provide a reversed arrangement in a different embodiment.

Instead of the sliding members 20 selected here, which are developed as sliding blocks, it is also possible to provide rolling members 26 to guide in the guide rails.

For the development of the pivot axis 13, which facilitates the swiveling of the second flat structural element 7 into its fixing position at the driver side in a swivel movement indicated by an arrow 21 in Ill. 6 while tensioning the flexible roof panel 8, a buttress 22 shown in Ill. 5 and Ill. 6 is provided, which is developed as an end segment of the guide rail 19 having an at least approximately L- or C-shaped cross section. The second flat structural element 7 travels into said buttress with the sliding member and/or the sliding block 20—as shown in a simplification in Ill. 6—upon appropriate movement transversally to the direction of the vehicle, and remains there after a swivel movement, shown by arrow 21, into the locking position of the soft top 5 and/or 5' shown by the dashed line.

Figure 7:
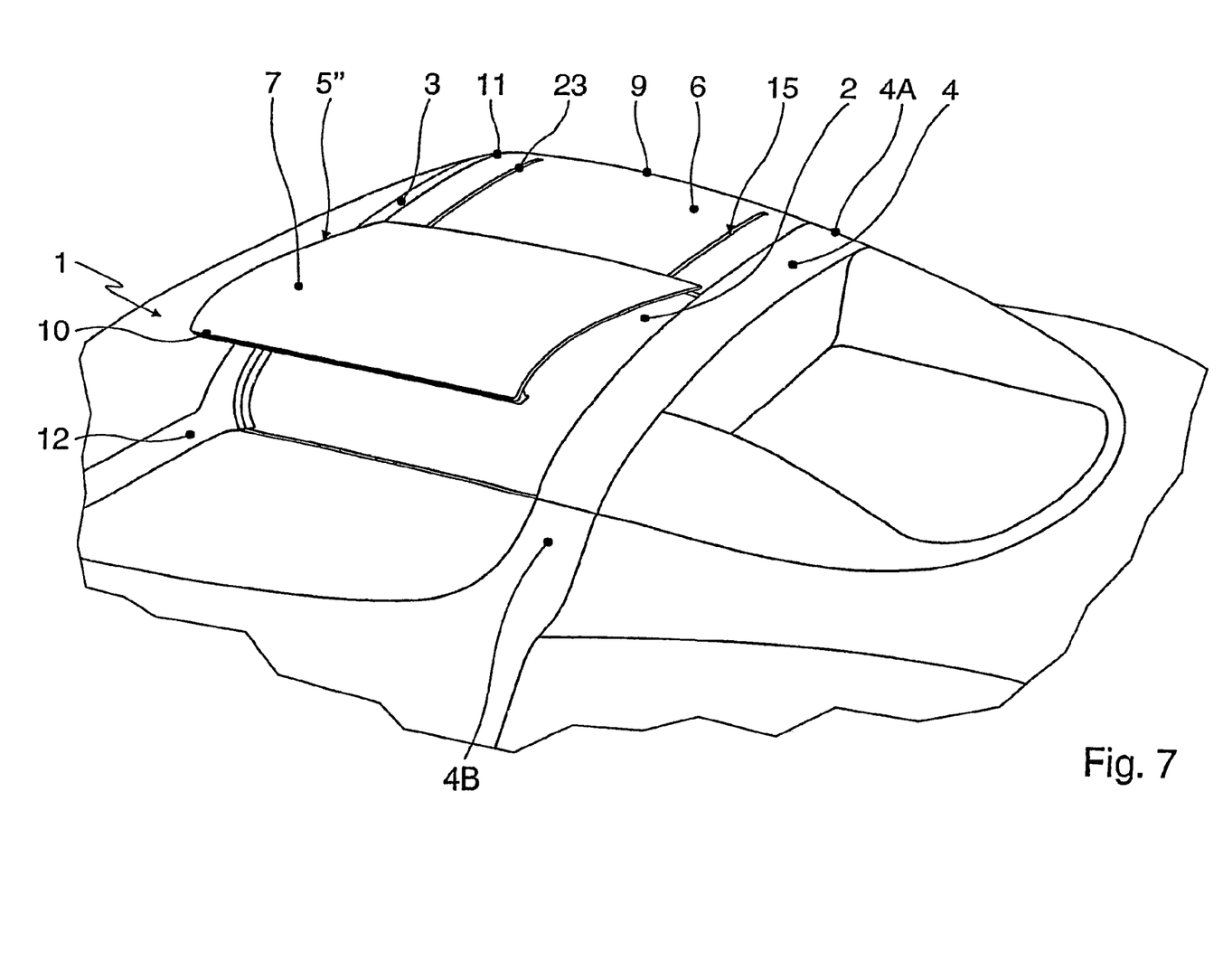

In the embodiment according to FIG. 7, the flat structural elements 6, 7 are developed to slide over one another, with the drive-side second flat structural element 7 being slid over the passenger-side first flat structural element 6 here to remove the folding top. To realize the displacement kinematics, the guide means 15, which interconnect the flat structural elements 6, 7, are presently developed with two guide rails 23 formed like slots at the first flat structural element 6, which engage with rolling members connected to the second flat structural element 7, or in the present case the sliding members 20. At the end of the slot-like guide rails 15 in the center of the vehicle, buttresses are preferably arranged as in the embodiments according to Ill. 1 to Ill. 6. Said buttresses form a pivot axis to swivel the second flat structural axis 7 into or from its locking position at the passenger-side lateral vehicle elements. The buttress can represent a separate component in the embodiment according to Ill. 7.

The locking of the flat structural elements 6, 7—which are again represented here without the flexible roof panel for reasons of clarity—at the lateral vehicle elements on the driver side and the passenger side is achieved in the embodiment according to Ill. 7 in the same way as with the embodiments according to Ill. 1 to Ill. 6.

In all of the shown embodiments, it is left up to one skilled in the art to provide additional catching- or locking means depending on the type of vehicle and the flow behavior resulting from the geometry of the roof to avoid a so-called ballooning at rapid speed.

In the shown embodiments, the flat structural elements 6, 7 are respectively developed in sheet metal construction or from a light metal material, but it goes without saying that the flat structural elements in different embodiments also can be made of plastic or of a glass fiber-reinforced plastic.

The flexible roof panel 8 is made of textile material in a conventional manner, but it can be made of a foil-like plastic in a simple embodiment.

To seal the soft top 5, 5', 5", the flexible roof panel 8 has in the border area of the flat structural elements 6 and 7 facing the windshield frame 3 as well as at their edges facing the rollover bow 4 a respective tensioning rope 24, as indicated in dashes in Ill. 1, which once mounted cooperates with a sealing means arranged at the flat structural elements 6 and 7, which in the most simplest case represents a gasket. The flat structural elements each have a sealing profile 25 at the front of the vehicle and at the rear of the vehicle, and a lateral rail seal 10A at the lateral rails 9 and/or 10.

In different embodiments, the textile roof panel may also extend beyond the flat structural elements 6, 7 at the front side and/or at the rear side to cooperate in a sealing fashion with a sealing means at the windshield frame and the rollover bow, for example through a tensioning rope.

REFERENCE SYMBOLS

1 Motor vehicle
2 Roof opening
3 Windshield frame
4 Bow, rollover bow
4A Lateral leg of bow
4B Lateral leg of bow
5, 5', 5" Folding top
6 First flat structural element
7 Second flat structural element
8 Roof panel
9 Lateral rail
10 Lateral rail
10A Lateral rail seal
11 A-column
12 A-column
13 Pivot axis
14 Guide means
15 Guide means
16 Recess
17 Fin
18 Arrow, mounting direction
19 Guide rail
20 Slide member, sliding block
21 Arrow, swivel direction
22 Buttress
23 Guide rails
24 Tensioning rope
25 Sealing profile

The invention claimed is:

1. Folding top for a motor vehicle (1), having at least a first and at least a second essentially flat structural element (6, 7) covered by a flexible roof panel (8), with the structural elements (6, 7) being designed to be mounted and detached over a roof opening (2) transversally to the longitudinal direction of the vehicle and once mounted, are fixed at the front at a windshield frame (3) and at the rear at a bow (4) that spans the width of the vehicle, characterized in that, the structural elements (6, 7) are interconnected by guide means (14, 15) and can be displaced relative to one another transversally to the longitudinal direction of the vehicle by means of said guide means (14, 15);

wherein, the guide means (14) are formed by guide rails (19) and rolling members that can move therein transversally to the longitudinal direction of the vehicle at lateral borders of at least one fin (17) and recess (16).

2. Folding top in accordance with claim 1, characterized in that, the structural elements (6, 7) are developed to be displaced relative to one another.

3. Folding top in accordance with claim 2, characterized in that, the first structural element (6) is developed with at least one recess extending transversally to the longitudinal direction of the vehicle and that a complementary formed fin (17) of a second structural element (7) connected to the first structural element (6) can engage in said recess.

4. Folding top in accordance with claim 1, characterized in that, the guide rails (19) are arranged at the first structural element (6) and the rolling member is arranged at the second structural element (7).

5. Folding top in accordance with claim 1, characterized in that, the structural elements (6, 7) are developed to be slid over one another.

6. Folding top in accordance with claim 5, characterized in that, the guide means (15) are formed by at least two guide rails (23), which are developed in a slot-like fashion at the first structural element (6), and rolling members, which reach through said slot-like guide rails (23) and are connected to a second structural element (7), which can be slid over the first structural element (6).

7. Folding top in accordance with claim 1, characterized in that, the first and the second structural element (6, 7) each have a lateral rail (9, 10) that can be connected to at least one lateral vehicle element (11, 12, 4A, 4B).

8. Folding top in accordance with claim 1, characterized in that, the structural elements (6, 7) can be spread over the roof opening (2) by fixing the first structural element (6) with its lateral rail (9) to an assigned lateral vehicle elements (11, 4A) and by guiding the at least second structural element (7) with its lateral rail (10) transversally to the longitudinal direction of the vehicle over the roof opening (2) to a connecting point with the lateral side elements of the vehicle (12, 4B) assigned to said structural element.

9. Folding top in accordance with claim 7, characterized in that, the lateral rail (9) of the first structural element (6) can be affixed at the assigned lateral vehicle elements (11, 4A).

10. Folding top in accordance with claim 7, characterized in that, the lateral rail (10) of the second structural element (7) is rotatably mounted around a pivot axis (13) to tension the roof panel (8) and can be connected to the assigned lateral vehicle elements (12, 4B).

11. Folding top in accordance with claim 10, characterized in that, the pivot axis (13) is formed by rolling members of the guide means (14, 15) guided into a buttress (22) at the guide rails (19, 23).

12. Folding top in accordance with claim 7, characterized in that, a lateral element of the vehicle which is connectable to the lateral rail (9, 10) at the front is formed by the windshield frame (3) in the area of an A-column (11, 12) and a lateral element of the vehicle which can connect to the lateral rail (9, 10) at the rear is formed by the rear bow (4, 4A, 4B).

13. Folding top in accordance with claim 1, characterized in that, the flexible roof panel (8), once installed, is oriented in an area of the first and second structural element (6, 7) bordering on lateral vehicle elements (11, 12, 4A, 4B).

14. Folding top for a motor vehicle (1), having at least a first and at least a second essentially flat structural element (6, 7) covered by a flexible roof panel (8), with the structural elements (6, 7) being designed to be mounted and detached over a roof opening (2) transversally to the longitudinal direction of the vehicle and once mounted, are fixed at the front at a windshield frame (3) and at the rear at a bow (4) that spans the width of the vehicle, characterized in that, the structural elements (6, 7) are interconnected by guide means (14, 15) and can be displaced relative to one another transversally to the longitudinal direction of the vehicle by means of said guide means (14, 15);

wherein, the guide means (14) are formed by guide rails (19) and sliding members (20) that can move therein transversally to the longitudinal direction of the vehicle at lateral borders of at least one fin (17) and recess (16).

15. Folding top in accordance with claim 14, characterized in that, the guide rails (19) are arranged at the first structural element (6) and the sliding member is arranged at the second structural element (7).

16. Folding top in accordance with claim 14 characterized in that, the guide means (15) are formed by at least two guide rails (23), which are developed in a slot-like fashion at the first structural element (6), and sliding members, which reach through said slot-like guide rails (23) and are connected to a second structural element (7), which can be slid over the first structural element (6).

17. Folding top in accordance with claim 10, characterized in that, the pivot axis (13) is formed by sliding members (20) of the guide means (14, 15) guided into a buttress (22) at the guide rails (19, 23).

* * * * *